US012808554B2

(12) United States Patent
Lee et al.

(10) Patent No.: US 12,808,554 B2
(45) Date of Patent: Nov. 24, 2026

(54) HUMIDIFIER

(71) Applicant: LG ELECTRONICS INC., Seoul (KR)

(72) Inventors: Kunyoung Lee, Seoul (KR); Keunman Park, Seoul (KR); Myungjin Ku, Seoul (KR); Junehee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 18/644,560

(22) Filed: Apr. 24, 2024

(65) Prior Publication Data

US 2024/0361020 A1 Oct. 31, 2024

(30) Foreign Application Priority Data

Apr. 27, 2023 (KR) ........................ 10-2023-0055138

(51) Int. Cl.

| | |
|---|---|
| ***F24F 6/12*** | (2006.01) |
| ***B01F 23/21*** | (2022.01) |
| ***B01F 23/213*** | (2022.01) |
| ***F24F 13/20*** | (2006.01) |
| *F24F 6/00* | (2006.01) |

(52) U.S. Cl.

CPC ............ *F24F 6/12* (2013.01); *B01F 23/2133* (2022.01); *F24F 13/20* (2013.01); *F24F 2006/006* (2013.01); *F24F 2006/008* (2013.01)

(58) Field of Classification Search

CPC .......... F24F 6/12; F24F 13/20; B01F 23/2133

See application file for complete search history.

(56) References Cited

U.S. PATENT DOCUMENTS

| | | | |
|---|---|---|---|
| 2021/0088236 | A1 | 3/2021 | Lee et al. |
| 2021/0222895 | A1 | 7/2021 | Bae et al. |

FOREIGN PATENT DOCUMENTS

| | | | | |
|---|---|---|---|---|
| CN | 109282410 | | 1/2021 | |
| JP | 2002168485 A | * | 6/2002 | |
| KR | 0143844 B1 | * | 8/1998 | ................ F24F 6/12 |
| KR | 20-2000-0005364 | | 3/2000 | |
| KR | 10-1409900 | | 6/2014 | |
| KR | 10-1921535 | | 11/2018 | |
| KR | 10-2021-0110537 | | 9/2021 | |
| KR | 10-2475399 | | 12/2022 | |

OTHER PUBLICATIONS

Korean Office Action dated Jul. 2, 2025, issued in Application No. 10-2023-0055138.

Extended European Search Report dated Sep. 20, 2024 issued in Application No. 24172339.4.

* cited by examiner

*Primary Examiner* — Robert A Hopkins

(74) *Attorney, Agent, or Firm* — KED & ASSOCIATES, LLP

(57) ABSTRACT

A humidifier may include a housing; a water heater tank disposed within the housing, a heater being located at a bottom of the water heater tank; a humidification water tank that is disposed within the housing and connected to the water heater tank to be supplied with water from the water heater tank; a vaporization unit that vaporizes water contained in the humidification water tank; and a drainage pipe that is connected to the water heater tank and drains the water contained in the water heater tank.

19 Claims, 12 Drawing Sheets

HUMIDIFIER

CROSS-REFERENCE TO RELATED APPLICATION(S)

This application claims priority under 35 U.S.C. § 119 to Korean Application No. 10-2023-0055138 filed in Korea on Apr. 27, 2023, whose entire disclosure is hereby incorporated by reference.

BACKGROUND

1. Field

A humidifier is disclosed herein.

2. Background

A humidifier is an appliance that releases humidified air containing large amounts of moisture into a room by vaporizing water. The humidifier is able to regulate humidity by vaporizing water by natural evaporation, evaporation by heating, or ultrasonic vibration, for example, and release it into a room.

The humidifier includes a tank that contains water. If water is left stagnant in the tank, bacteria, and mold, for example, will grow and multiply, which can lead to poor hygiene and produce odors. To prevent this, the water tank needs to be designed with a small capacity, and requires a regular change of water, which, however, makes the user go through the trouble of supplying water and cleaning the water tank often. In this regard, a lot of research is being carried out to prevent odors in the water tank in the humidifier and enhance user convenience.

BRIEF DESCRIPTION OF THE DRAWINGS

Embodiments will be described in detail with reference to the following drawings in which like reference numerals refer to like elements, and wherein.

DETAILED DESCRIPTION

Figure 1:
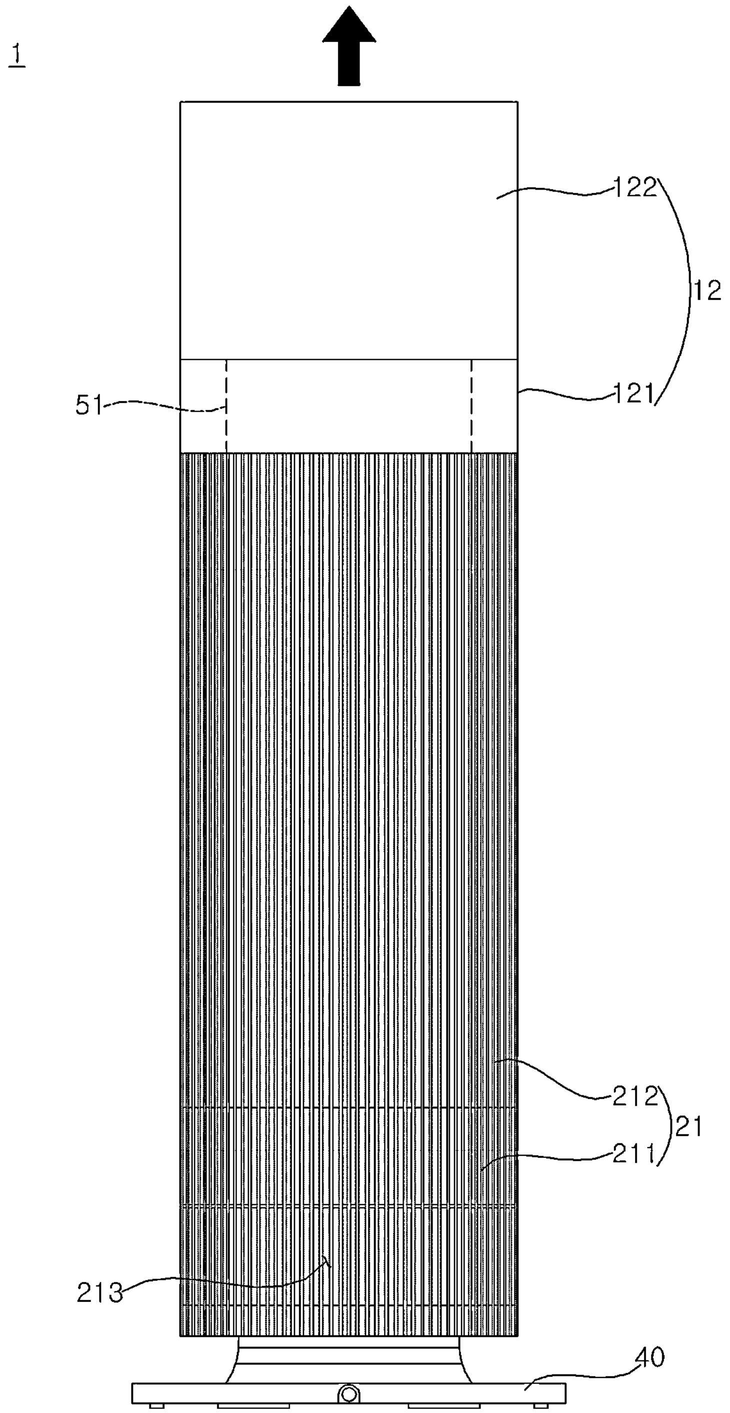
FIG. 1 is a side view of a humidifier according to an embodiment.

Hereinafter, embodiments will be described with reference to the accompanying drawings. The same or similar elements will be assigned the same reference numerals irrespective of the reference numerals, and redundant descriptions thereof will be omitted.

The suffixes "module", "unit", "part", and "portion used to describe constituent elements in the following description are used together or interchangeably to facilitate the description, but the suffixes themselves do not have distinguishable meanings or functions.

In describing embodiments disclosed herein, description of related known technology will be omitted when it is deemed that it may unnecessarily obscure the subject matter. Also, it should be understood that the appended drawings are intended only to help understand the embodiments disclosed herein and do not limit the technical idea; rather, it should be understood that all changes, equivalents, and substitutions included in the technical scope and spirit are included.

Terms such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The singular expressions may include plural expressions unless the context clearly dictates otherwise.

Hereinafter, a humidifier 1 will be described with reference to FIG. 1. Referring to FIG. 1, the humidifier 1 may draw outside air through an intake opening 213 and then discharge humidified air upward, along with steam generated from the inside. The humidifier 1 may include an outer shell 12 and an inlet cover 21 which form an outer appearance of the humidifier 1. The outer shell 12 may be disposed above the inlet cover 21. The outer shell 12 and the inlet cover 21 may extend vertically. The outer shell 12 and the inlet cover 21 may be substantially cylindrical, for example.

The outer shell 12 may include a window 121 and a panel 122. The window 121 may be coupled to a lower side of the panel 122. The window 121 may be formed of a transparent material, for example, and the panel 122 may be formed of an opaque material, for example.

An inner shell 51 may be disposed inside of the outer shell 12. The inner shell 51 may be visible from outside through the window 121. Air and/or steam may flow inside of the window 121. The flow of the air and/or steam may be observed from the outside through the window 121.

The inlet cover 21 may include a grille 211 through which air is drawn and a panel 212. The grille 211 may include a plurality of bars, and the intake opening 213 may be formed between the plurality of bars. The panel 212 may be connected to an upper end of the grille 211. Outside air drawn into the humidifier 1 through the intake opening 213 may be filtered inside of the humidifier 1 and discharged upward.

Figure 2:
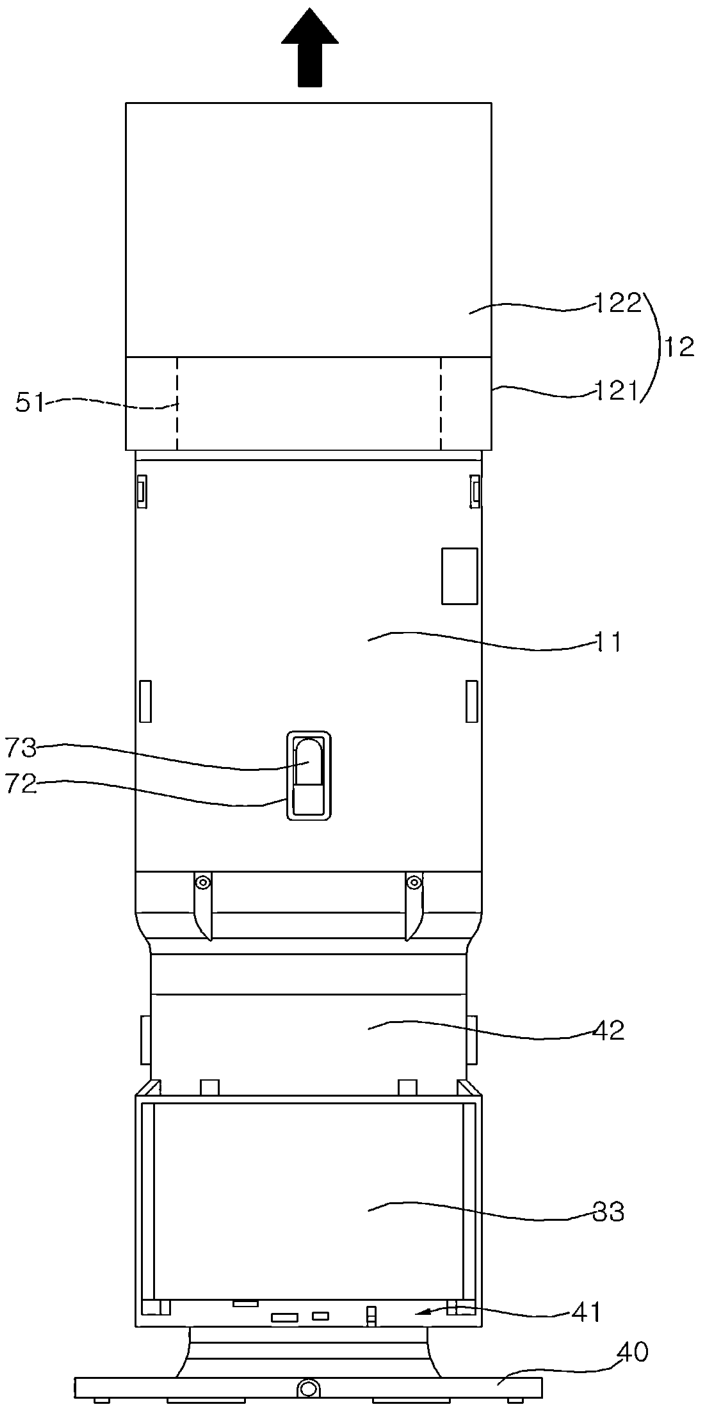
FIG. 2 is a side view of a portion of a humidifier according to an embodiment.

FIG. 2 illustrates the humidifier 1 with the inlet cover 21 removed. Hereinafter, an outer appearance of the humidifier 1 with the inlet cover 21 removed will be described with reference to FIG. 2.

Referring to FIG. 2, the humidifier 1 may include a housing 11 with a water tank disposed in it, a filter 33 that filters outside air, a base 40 seated on the ground, a lower body 41 coupled to an upper side of the base 40, in which the filter 33 is mounted, and an upper body 42 coupled to an upper side of the lower body 41, with a blower fan 31 disposed in the upper body 42.

The housing 11 may be coupled to a lower side of the outer shell 12. The housing 11 may be coupled to a lower side of the window 121. The panel 212 of the inlet cover 21 may be removably mounted to the housing 11. The housing 11 and the outer shell 12 may be collectively referred to as a housing. Components, such as a water tank that stores water, and a unit that vaporizes water, for example, may be accommodated in the housing 11, and internal components of the housing 11 will be described hereinafter.

The filter 33 may be positioned inside of the grille 211 of the inlet cover 21. The filter 33 may filter the air drawn in through the intake opening 213. The filter 33 may be disposed between the lower body 41 and the upper body 42.

The lower body 41 may be connected to the upper side of the base 40. The upper body 42 may be connected to the upper side of the lower body 41. The base 40 may support the humidifier 1 with respect to the ground. The blower fan 31 (see FIG. 3) and a motor 32 (see FIG. 3) may be disposed inside of the upper body 42. The upper body 42 may have a cylindrical shape, for example. The panel 212 of the inlet cover 21 may be removably mounted to the upper body 42.

When the inlet cover 21 is removed, a drainage port 73 may be exposed to the outside. The humidifier 1 may include a mount 72 attached to the housing 11 and the drainage port 73 fitted to the mount 72.

Although the mount 72 is located on the housing 11 in this embodiment, its position is not limited to this. The mount 72 may be disposed at a position other than that shown in FIG. 2. For example, the mount 72 may be disposed on the upper body 42. The drainage port 73 may be connected to a water heater tank 61 (see FIG. 3) in the humidifier 1 to drain water.

Figure 3:
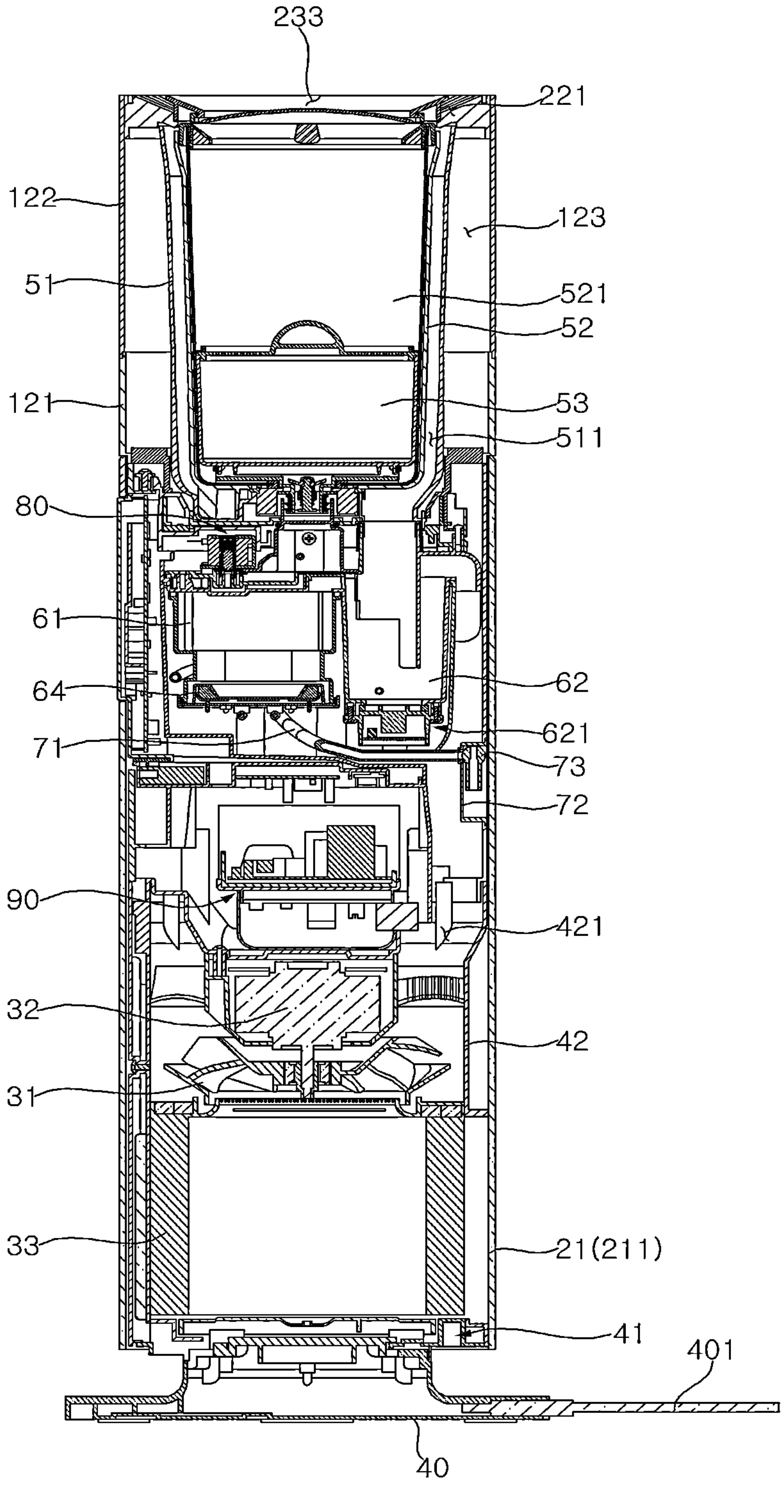
FIG. 3 is a cross-sectional view of a humidifier according to an embodiment.

Hereinafter, an overall configuration of the humidifier 1 will be described with reference to FIG. 3. Referring to FIG. 3, the humidifier 1 may include the blower fan 31 that forces air to flow and the motor 32 that rotates the blower fan 31. The blower fan 31 and the motor 32 may be disposed in the upper body 42. Airflow induced by the blower fan 41 may move to a discharge opening 221, along with generated steam.

Referring to FIG. 3, the humidifier 1 may include the inner shell 51 disposed within the outer shell 12, a softening water tank 52 disposed within the inner shell 51, and a softening chamber 53 mounted within the softening water tank 52. The inner shell 51 may be spaced inward from the outer shell 12. A flow path 123 may be formed between the inner shell 51 and the outer shell 12. At least a portion of the air forced to move by the blower fan 31 may flow to the flow path 123. The inner shell 51 may have the shape of a cylinder that extends vertically, for example.

A flow path 511 may be formed between the inner shell 51 and the softening water tank 52. The flow path 511 may communicate with an inside of a humidification water tank 62. At least a portion of the air forced to move by the blower fan 31 may flow to the flow path 511, along with steam. The flow path 511 may communicate with the discharge opening 221, and air and steam guided to the flow path 511 may flow out of the humidifier 1 through the discharge opening 221.

The inner shell 51 may be at least partially formed of a transparent material, for example. For example, a portion of the inner shell 51 facing the window 121 may be formed of a transparent material. Alternatively, the inner shell 51 may be formed entirely of a transparent material. Steam and air flowing inside of the flow path 511 may be observed from the outside through the inner shell 51 and the window 121.

The water softening tank 52 may be disposed within the inner shell 51. The softening water tank 52 may be disposed below a filling opening 233. The softening water tank 52 may have an aperture at a top thereof. Water supplied through the filling opening 233 may be admitted into the softening water tank 52. The softening water tank 52 may have the shape of a cylinder that extends vertically, for example.

The softening chamber 53 may be disposed within the softening water tank 52. The softening chamber 53 may be disposed in or at a lower portion of the softening water tank 52 and supported by a bottom of the softening water tank 52. The softening chamber 53 may filter the water admitted to the softening water tank 52.

The softening chamber 53 may be coupled to an inner lateral surface of the softening water tank 52. Alternatively, the softening chamber 53 may be securely attached to an inner lateral surface of the softening water tank 52. The water admitted to the softening water tank 52 may pass through the softening water tank 53 and be filtered through it and then flow to a connecting portion 80, without leakage between the softening chamber 53 and the softening water tank 52.

Referring to FIG. 3, the humidifier 1 may include the connecting portion 80 that connects the softening water tank 52 and the water heater tank 61. The softening water tank 52 may be connected to the water heater tank 61 through the connecting portion 80. Opening and closing of the connecting portion 80 may be controlled by a printed circuit board 90. The connecting portion 80 may be positioned lower than the softening water tank 52. The connecting portion 80 may be positioned higher than the water heater tank 61 or the humidification water tank 62. The connecting portion 80 will be described hereinafter.

Water heater tank referring to FIG. 3, the humidifier 1 may include the water heater tank 61 with a heater 64 disposed in the water heater tank 61 and the humidification water tank 62 that generates steam. At least a portion of the water contained in the softening water tank 52 may be supplied to the water heater tank 61 through the connecting portion 80. The heater 64 may be mounted to the water heater tank 61. For example, the heater 64 may be mounted to a bottom of the water heater tank 61. The heater 64 may be disposed within the water heater tank 61 and heat the water contained in the water heater tank 61.

The water heater tank 61 may be connected to the humidification water tank 62 through a pipe. At least a portion of the water heated in the water heater tank 61 may be supplied to the humidification water tank 62. Also, the water heater tank 61 and the humidification water tank 62 may communicate with each other.

A vaporization unit 621 may be mounted to or in the humidification water tank 62. The vaporization unit 621 may vaporize the water contained in the humidification water tank 62. For example, the vaporization unit 621 may include a vibrator that atomizes water using ultrasonic vibration. Steam generated by the vaporization unit 621 may flow through the flow path 511 between the inner shell 51 and the softening water tank 52.

Referring to FIG. 3, the humidifier 1 may include a drainage pipe 71 through which water is drained from the water heater tank 61. The drainage pipe 71 may connect the water heater tank 61 and the mount 72. The water drained from the water heater tank 61 may flow to the drainage port 73 through the drainage pipe 71. The drainage pipe 71 will be described hereinafter.

Referring to FIG. 3, the humidifier 1 may include the printed circuit board 90 to which a controller (not shown) that controls operation of the humidifier 1 may be connected. The printed circuit board 90 may control operation of the heater 64. The printed circuit board 90 may be connected to the heater 64 and control the operation of the heater 64. The printed circuit board 90 may be connected to the vaporization unit 621 and control operation of the vaporization unit 621. The printed circuit board 90 may be connected to the motor 32 and control operation of the motor 32.

Hereinafter, the supply of water and the flow of air and steam will be described with reference to FIG. 4.

Figure 4:
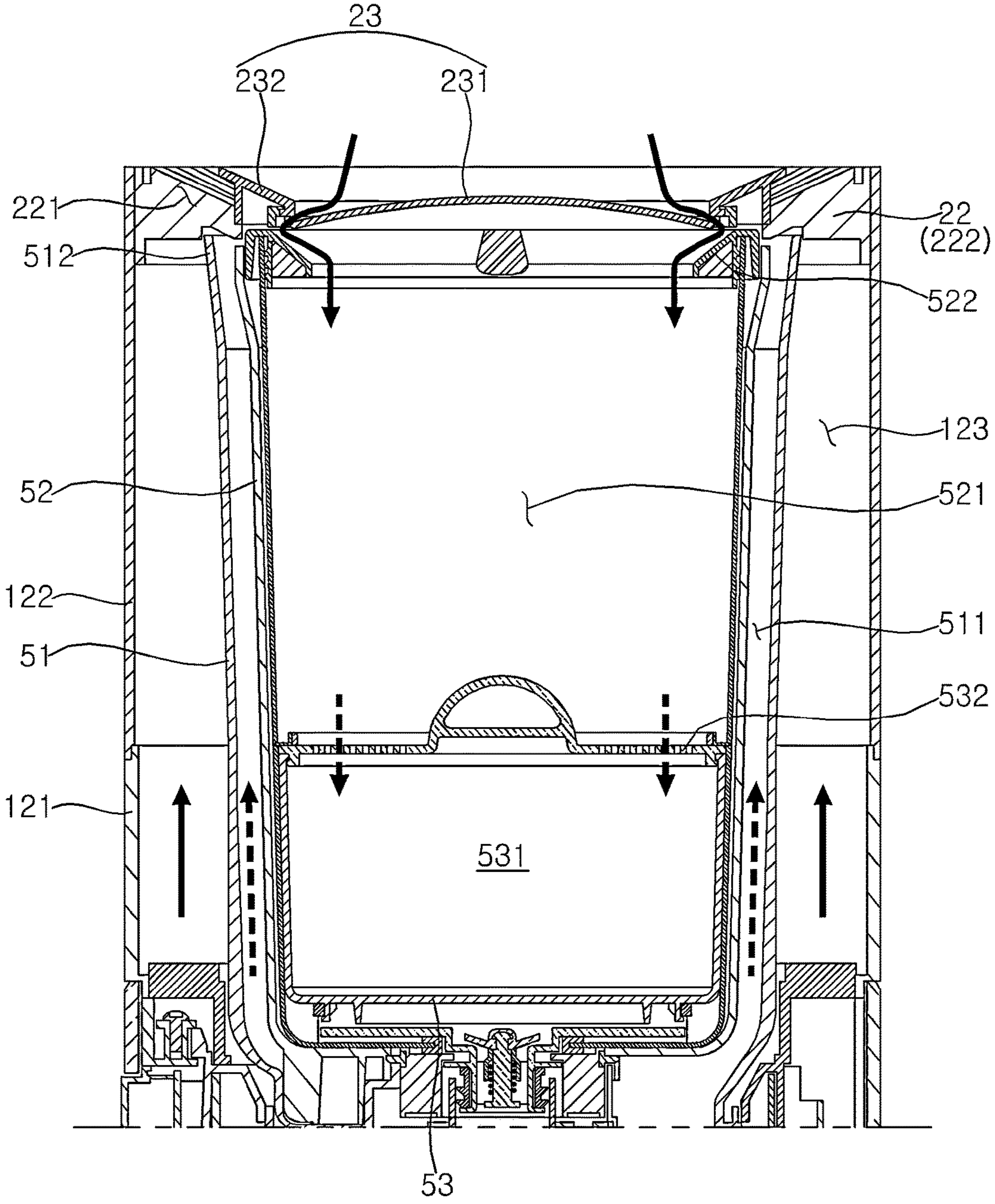
FIGS. 4, 5, and 6 are enlarged views of a portion of the cross-sectional view of the humidifier in FIG. 3.

FIG. 4 illustrates how water is injected into the humidifier 1 and how steam and air flow within the humidifier 1. Referring to FIG. 4, the humidifier 1 may include an outlet cover 22 with a discharge opening 221 and a water tank cover 23 with the filling opening 233.

The outlet cover 22 may include a plurality of vanes 222 that forms the discharge opening 221. The outlet cover 22 may have a ring shape. The plurality of vanes 222 of the outlet cover 22 may extend radially. The discharge opening 221 may be formed between the plurality of vanes 222. The outlet cover 22 may be disposed on an upper side of the humidifier 1. The outlet cover 22 may be coupled to an upper side of the outer shell 12. The water tank cover 23 may be disposed radially inward from the outlet cover 22.

The water tank cover 23 may be disposed on an upper side of the softening water tank 52. The water tank cover 23 may be coupled to an upper end of the softening water tank 52. The water tank cover 23 may form the filling opening 233. The water tank cover 23 may include a cap 231 and a guide 232.

The cap 231 may slope downward toward a periphery thereof, away from a center thereof. For example, the cap 231 may have a shape of a disc that curves upward in the center. The cap 231 may direct water toward the periphery.

The guide 232 may be positioned adjacent to the periphery of the cap 231. The guide 232 may be positioned above the periphery of the cap 231. The guide 232 may slope downward toward a center, away from a periphery thereof. For example, the guide 232 may have the shape of a ring that slopes downward toward the center. The guide 232 may direct water toward the center. The filling opening 233 according to an embodiment may refer to, but is not limited to, a space formed inside of the guide 232.

The water admitted through the filling opening 233 may be directed toward the guide 522 of the softening water tank 52. The guide 522 may be positioned below the periphery of the cap 231. The guide 522 may slope downward toward a center away from a periphery thereof. For example, the guide 522 may have the shape of a ring that slopes downward toward the center. The guide 52 may direct water toward the center. The guide 522 may be coupled to the upper end of the softening water tank 52.

Water admitted to a storage space 521 of the softening water tank 52 may enter the softening chamber 53 through a plurality of holes 532. The plurality of holes 532 may be formed in an upper surface of the softening chamber 53. A softener 531 that reduces water hardness may be contained in the softening chamber 53. The water admitted to the storage space 521 may be softened by the softener 531 and supplied to the connecting portion 80. A plurality of holes may also be formed in a lower surface of the softening chamber 53.

At least a portion of the air forced to move by the blower fan 31 may flow to the discharge opening 221 along the flow path 123. Also, at least a portion of the air forced to move by the blower fan 31 and steam may flow to the discharge opening 221 along the flow path 511.

An upper end 512 of the inner shell 51 may be positioned below the discharge opening 221. The upper end 512 of the inner shell 51 may form a boundary between the two flow paths 123 and 511. Thus, the steam flowing upward along the flow path 511 may be discharged out of the humidifier 1 through the discharge opening 221. Also, the air flowing upward along the flow path 123 may be discharged out of the humidifier 1 through the discharge opening 221.

Figure 5:
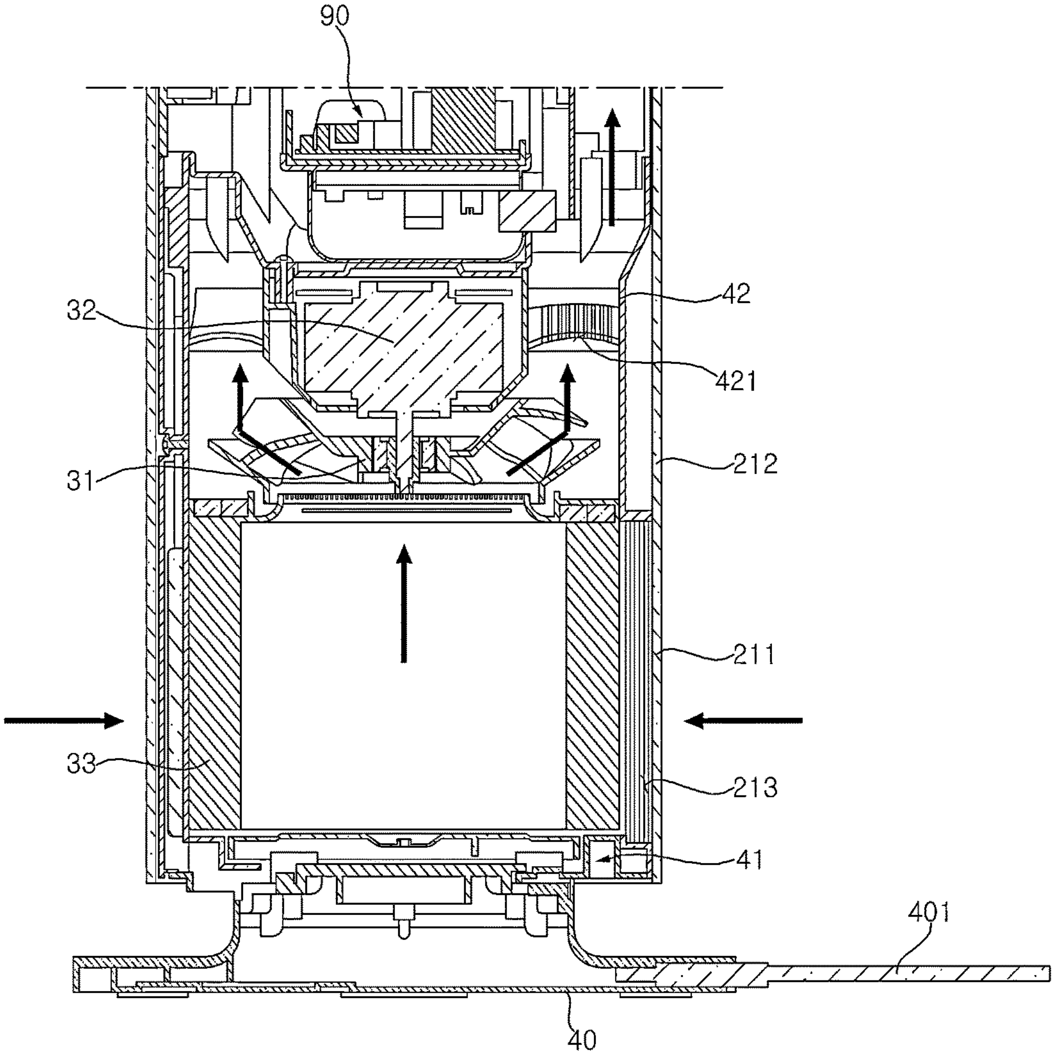

Hereinafter, referring to FIGS. 5 and 6, description will be given regarding how outside air drawn into the humidifier 1 is filtered through the filter 33 and flows to the humidification water tank 62. Referring to FIG. 5, the air drawn in through the intake opening 213 may pass through the filter 33 and then enter the blower fan 31. The air purified through the filter 33 may flow upward along a flow path 421 inside of the upper body 42. A portion of the purified air may enter the humidification water tank 62.

Figure 6:
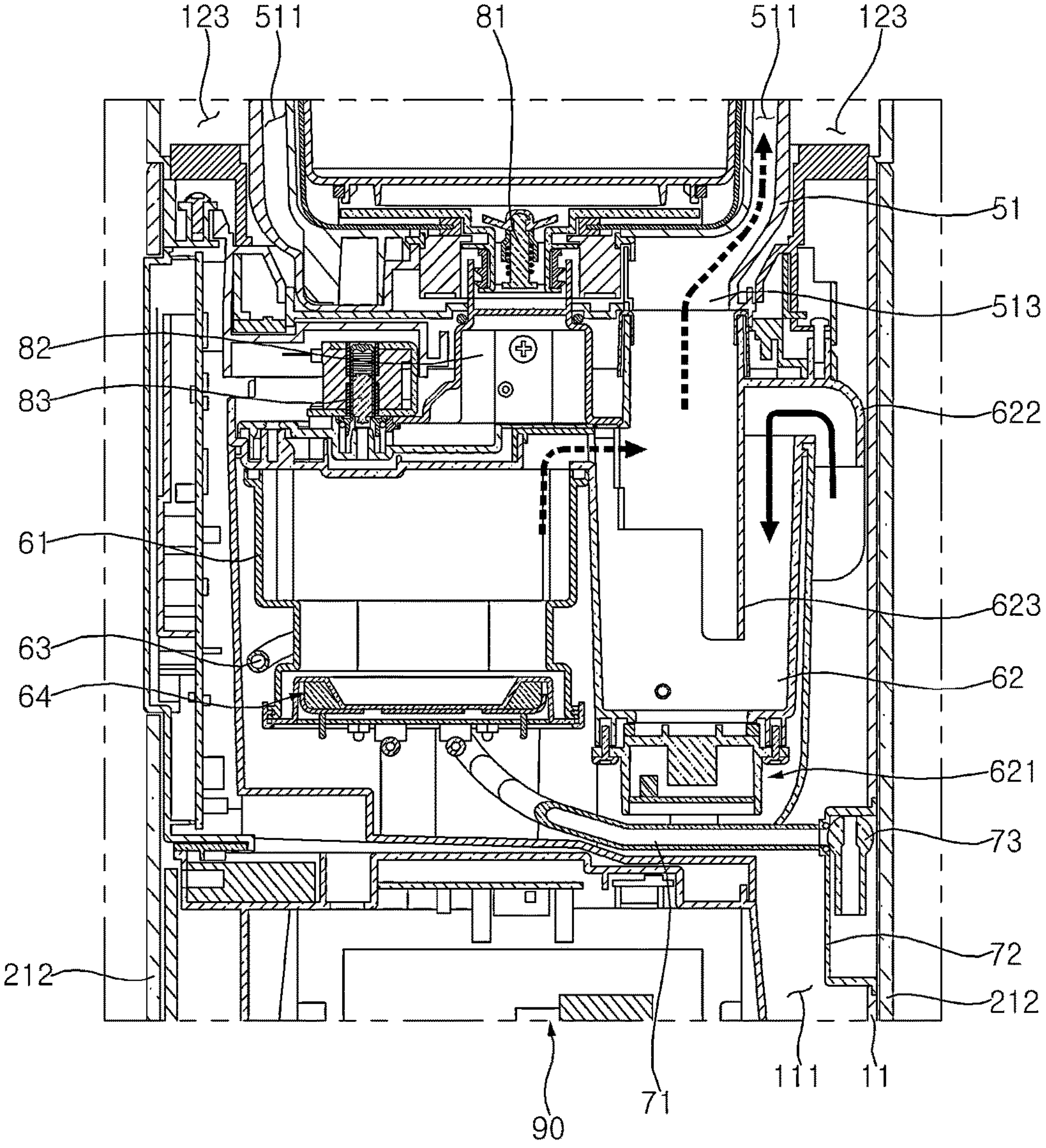

FIG. 6 illustrates how steam generated in the water heater tank 61 and the humidification water tank 62 enters the flow path 511. Referring to FIG. 6, the water heater tank 61 and the humidification water tank 62 communicate with each other via a hole 612 (see FIG. 7), thereby allowing the steam generated by the heater 64 to flow to the humidification water tank 62 through the hole 612.

Water may be supplied from the water heater tank 61 to the humidification water tank 62 through a supply pipe 63. The water supplied to the humidification water tank 62 may be vaporized by the vaporization unit 621. The steam discharged from the water heater tank 61 to the humidification water tank 62 and the steam generated by vaporization using the vaporization unit 621 may flow to the flow path 511 through a discharge channel 623. The humidification water tank 62 may include an intake channel 622 through which the purified air enters and the discharge channel 623 one end of which protrudes into the humidification water tank 62.

A flow path 111 may be formed inside of the housing 11. The air forced to move by the blower fan 31 may flow upward along the flow path 111. A portion of the air forced to move upward along the flow path 111 may be directed into the water tank 62 by the intake channel 622, and the rest of the air may flow to the flow path 123 inside of the outer shell 12. The intake channel 622 may protrude into the flow path 111, with a bottom thereof being open so that air is directed into the humidification water tank 62.

The discharge channel 623 may communicate with a hole 513 formed in a bottom of the inner shell 51. Steam may enter the flow path 511 through the discharge channel 623 and the hole 513. The discharge channel 623 may extend vertically. The air admitted to the humidification water tank 62 through the intake channel 622 may flow downward along a space between side walls of the discharge channel 623 and the humidification water tank 62 and then flow upward along the discharge channel 523. Thus, at least a portion of the air forced to move by the blower fan 31 may deliver steam to the flow path 511 while flowing to the flow path 511 through the humidification water tank 62.

The connecting portion 80 may include a first valve 81 that opens and closes a flow path that connects the softening water tank 52 and a sensor housing 82, the sensor housing 82 fitted with a hardness sensor 821 (see FIG. 10), and a second valve 83 that opens and closes a flow path that connects the sensor housing 82 and the water heater tank 61. The sensor housing 82 may be fitted with the hardness sensor 821 (see FIG. 10). Water whose hardness is lowered by the softener 531 as it passes through the softening chamber 53 may be supplied to the water heater tank 61 via the sensor housing 82. The hardness sensor 821 may measure a hardness of the water contained in the sensor housing 82. If the water hardness measured by the hardness sensor 821 is higher than a preset or predetermined reference value, the user may be notified that the softening chamber 53 needs replacement.

Figure 7:
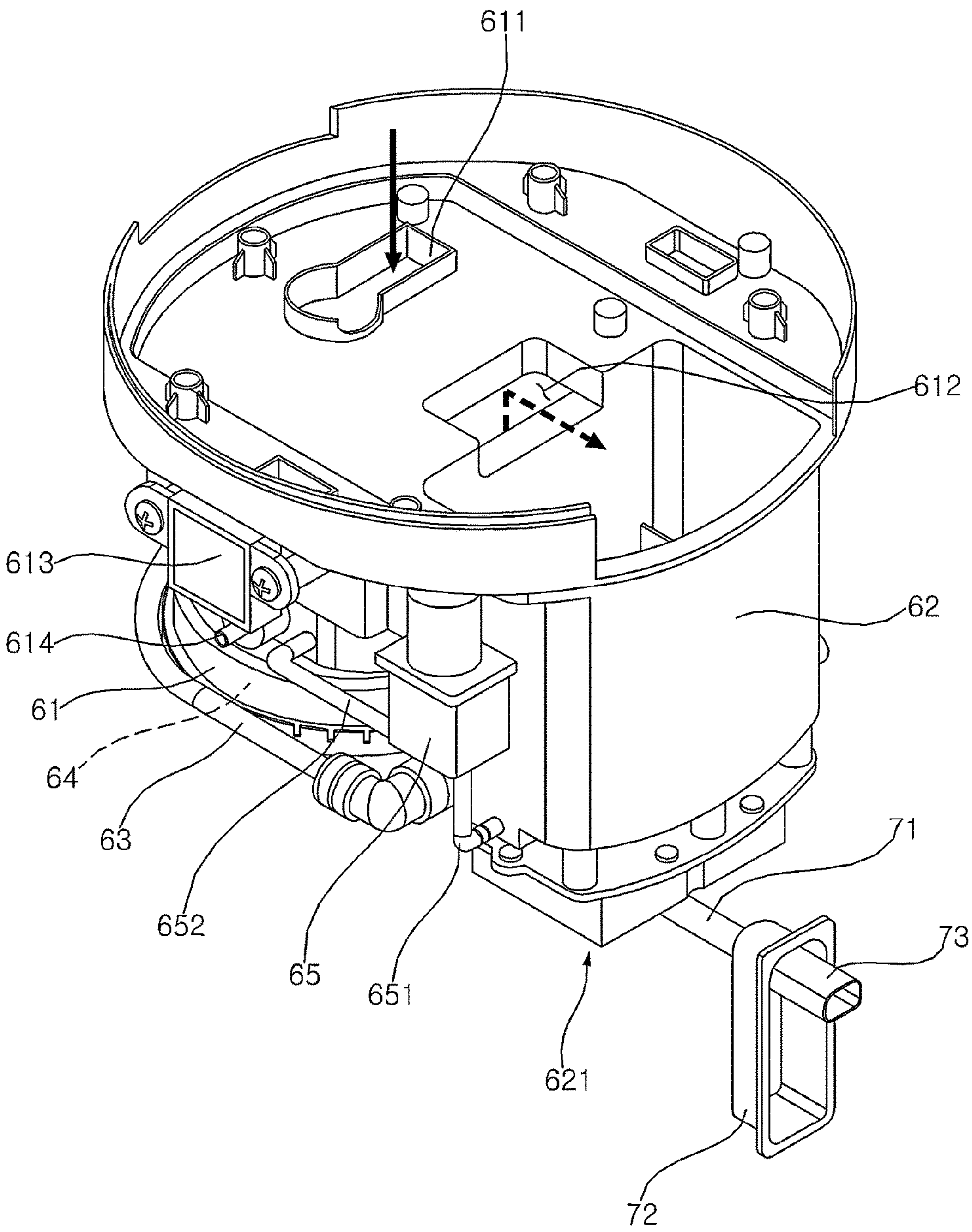
FIG. 7 is a perspective view of a water tank and a drainage structure of a humidifier according to an embodiment.

Hereinafter, the water heater tank 61 and the heater 64 will be described with reference to FIGS. 7 and 8. Referring to FIG. 7, the humidifier 1 may include a first water level sensor 613 that measures a water level in the water heater tank 61 and a first temperature sensor 614 that measures a temperature in the water heater tank 61. The first water level sensor 613 and the first temperature sensor 614 may be mounted to the water heater tank 61. The first water level sensor 613 may measure the water level in the water heater tank 61. The first temperature sensor 614 may measure the temperature of the water contained in the water heater tank 61. The water heater tank 61 may be prevented from overheating by means of the first temperature sensor 614.

Figure 8:
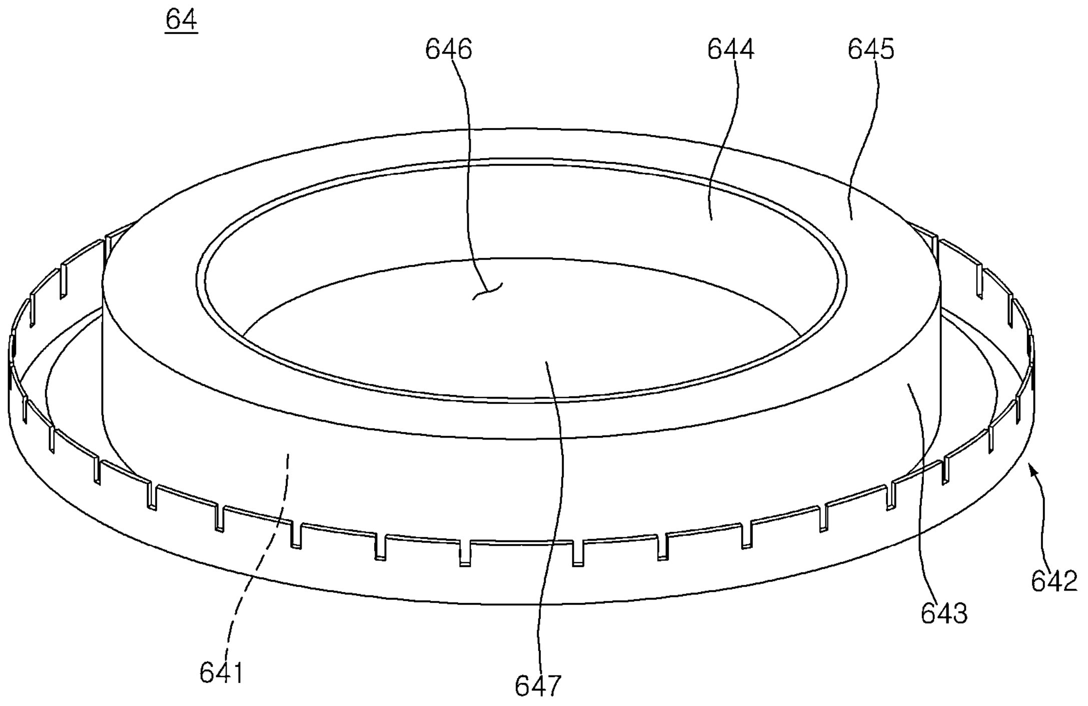
FIG. 8 is a perspective view of a humidifier heater according to an embodiment.

Referring to FIG. 8, the humidifier 1 may include the heater 64. The heater 64 may be disposed within the water heater tank 61. The heater 64 may include a plate 642 that forms an exterior thereof and a heating element 641 disposed within the plate 642. For example, the heater 64 may be a sheath heater.

The plate 642 of the heater 64 may be substantially ring-shaped, for example, and provide a space inside of which the heating element 641 is disposed. The plate 642 may be formed by downwardly recessing a center portion 647. The plate 642 may include an inner peripheral surface 644 that extends upward from the recessed center portion 647, an outer peripheral surface 643 that extends around the inner peripheral surface 644, and a connecting surface 645 that connects an upper end of the inner peripheral surface 644 and an upper end of the outer peripheral surface 643. The heating element 641 may release heat into the water heater tank 61 through the inner peripheral surface 644, the outer peripheral surface 643, and the connecting surface 645.

Figure 9:
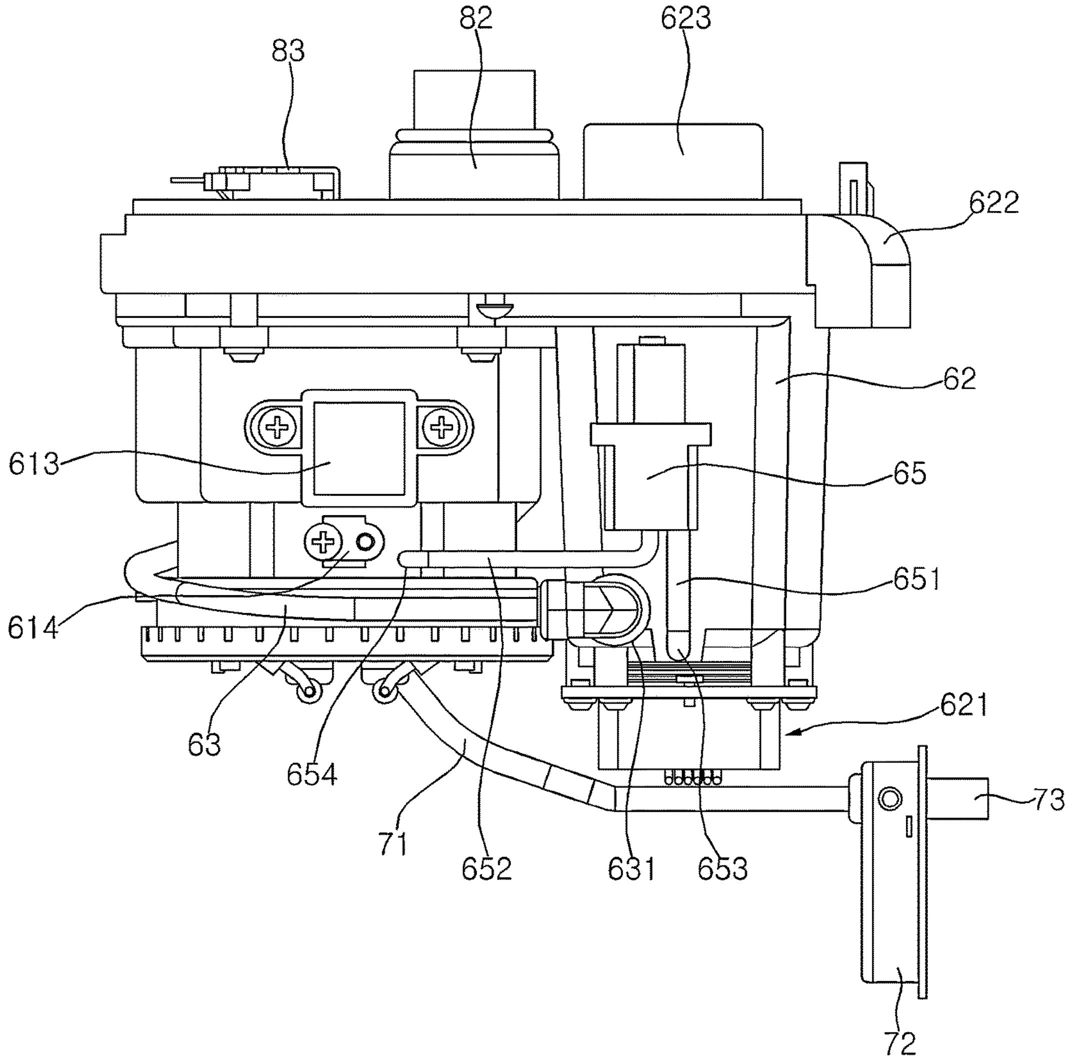
FIGS. 9 and 10 are side views of a water tank and a drainage structure of a humidifier according to an embodiment.
Figure 10:
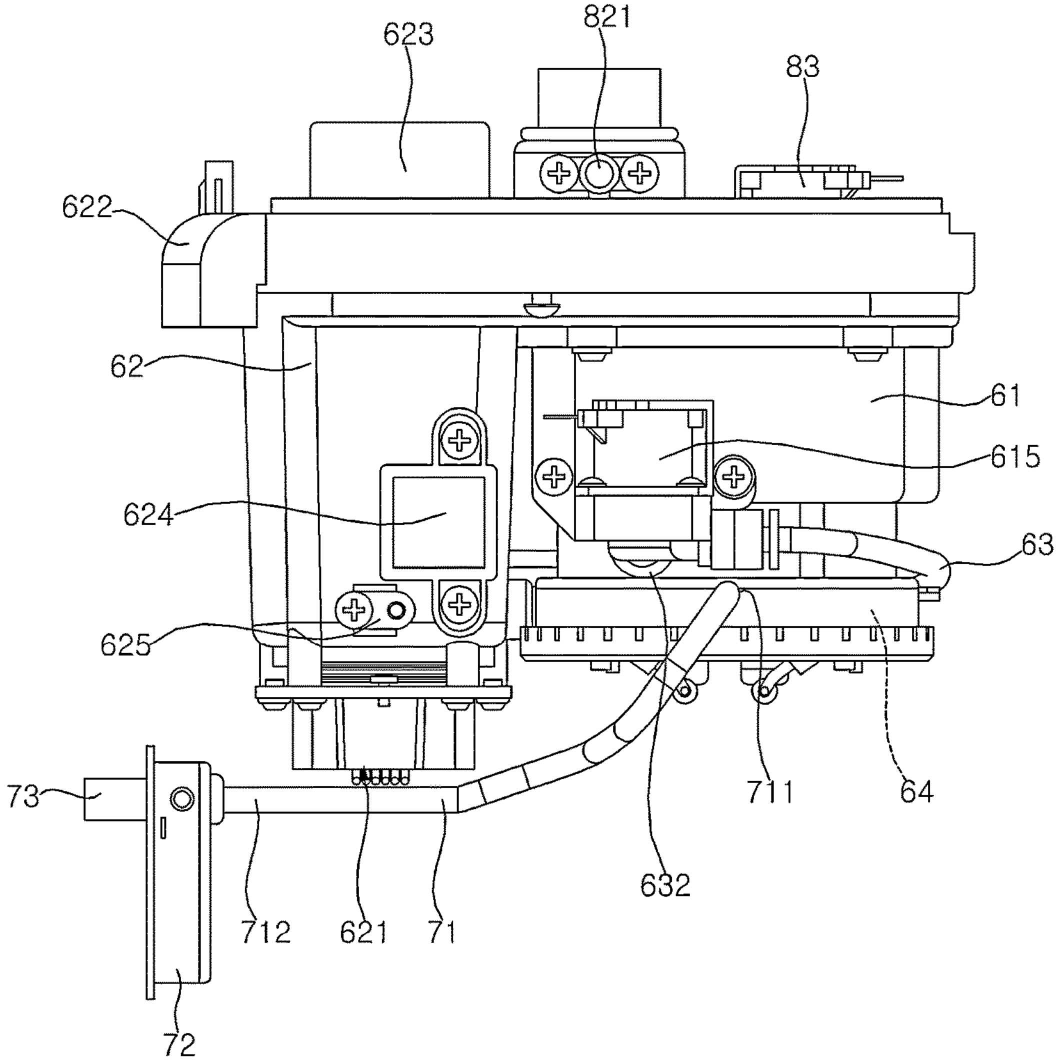

Hereinafter, the water heater tank 61, the humidification water tank 62, and structure that connects the water heater tank 61 and the humidification water tank 62 will be described with reference to FIGS. 9 and 10. Referring to FIGS. 9 and 10, the humidifier 1 may include a third valve 615 that opens and closes the supply pipe 63, a second water level sensor 624 that measures a water level in the humidification water tank 62, and a second temperature sensor 625 that measures a water temperature in the humidification water tank 62. The humidifier 1 may include a pump 65 that pumps the water in the humidification water tank 62 into the water heater tank 61.

The pump 65 may be mounted to the humidification water tank 62. The pump 65 may be connected to the humidification water tank 62 through a first connecting pipe 651. The pump 65 may be connected to the water heater tank 61 through a second connecting pipe 652. The pump 65 may pump the water contained in the humidification water tank 62 into the water heater tank 61. When the vaporization unit 621 stops operating, the pump 65 may force residual water in the humidification water tank 62 into the water heater tank 61. One or a first end 631 of the supply pipe 63 may be positioned adjacent to a bottom of the humidification water tank 62.

The pump 65 may minimize odors caused by water remaining in the humidification water tank 62. One or a first end 653 of the first connecting pipe 651 may be positioned adjacent to a lower end of the humidification water tank 62. Thus, the amount of residual water in the humidification water tank 62 may be minimized. One or a first end 654 of the second connecting pipe 652 connected to the water heater tank 61 may be positioned higher than the heater 64.

The second water level sensor 624 and the second temperature sensor 625 may be mounted to the humidification water tank 62. The second water level sensor 624 may measure the water level in the humidification water tank 62. The second temperature sensor 625 may measure the temperature of the water contained in the humidification water tank 62. By means of the second temperature sensor 625, the humidification water tank 62 may be prevented from overheating due to the water and steam supplied from the water heater tank 61.

The third valve 615 may be connected to the supply pipe 63 and open and close the supply pipe 63. The third valve 615 may be mounted to the water heater tank 61. The third valve 615 may be spaced upward from the heater 64 in order to prevent damage by the heater 64.

The other or a second end 632 of the supply pipe 63 and one or a first end 711 of the drainage pipe 71 may be positioned close to each other. The second end 632 of the supply pipe 63, situated opposite the first end 654 of the second connecting pipe 652, may be connected to the water heater tank 61. The first end 711 of the drainage pipe 71, situated opposite the first end 654 of the second connecting pipe 652, may be connected to the water heater tank 61.

The drainage pipe 71 may extend downward from the first end 711 connected to a lateral side of the water heater tank 61 to the other or a second end 712. For example, the drainage pipe 71 may extend at a slant downward from the first end 711 and extend horizontally from the second end 712. The drainage pipe 71 may be positioned adjacent to the bottom of the water heater tank 61. The first end 711 of the drainage pipe 71 may be positioned next to the heater 64 disposed at the bottom of the water heater tank 61.

Figure 11:
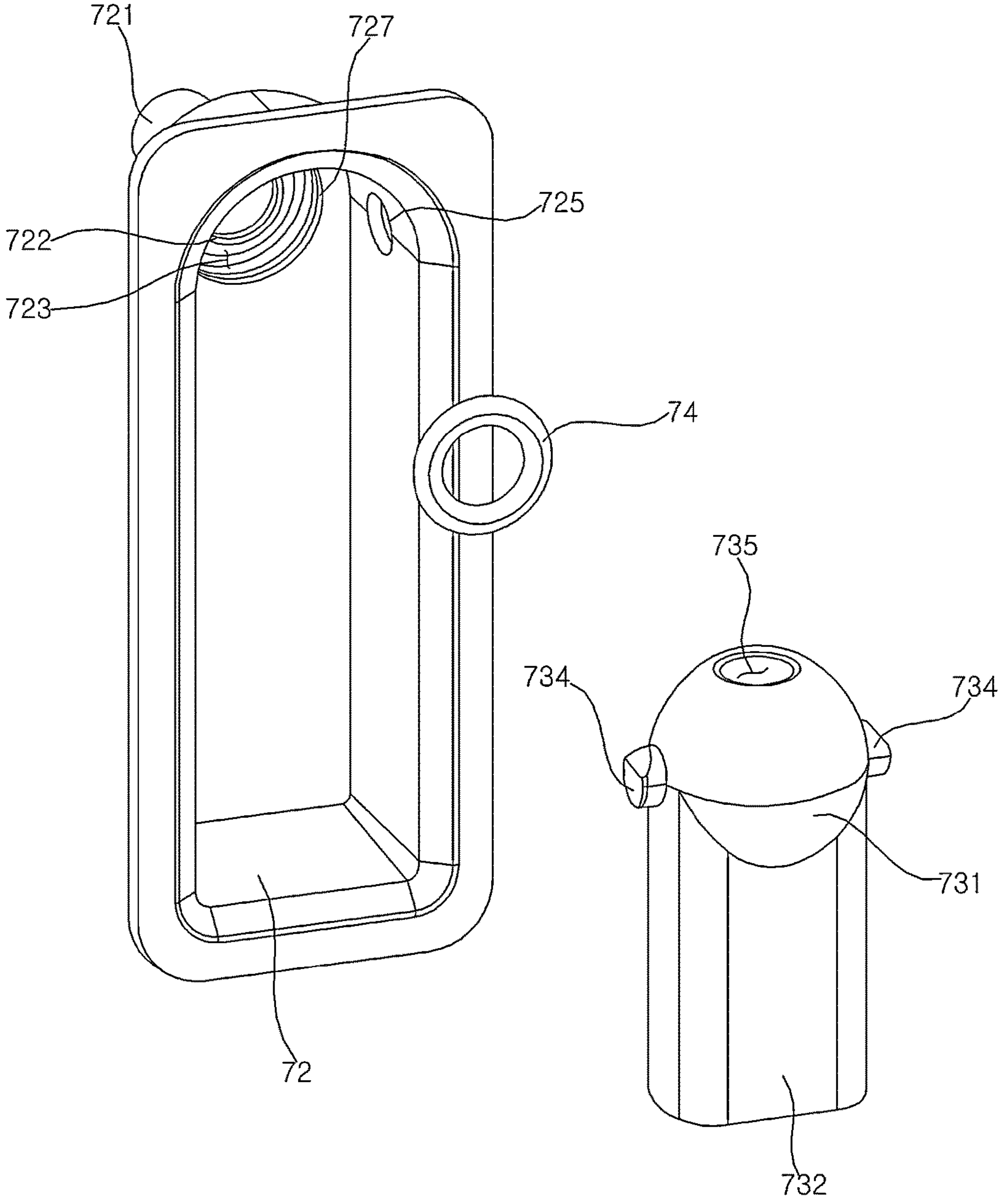
FIG. 11 is an exploded perspective view of a humidifier drainage structure according to an embodiment.
Figure 12:
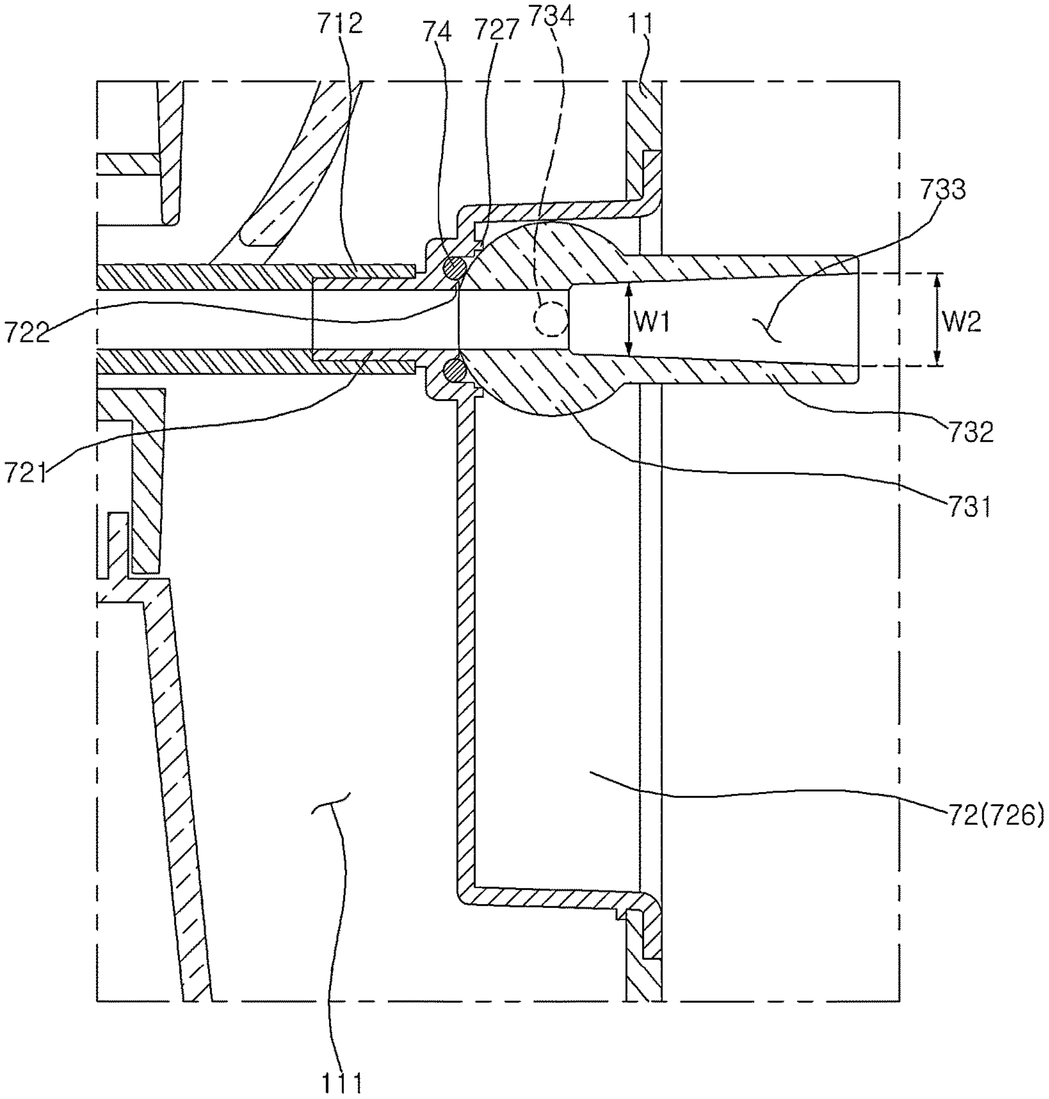
FIG. 12 is a cross-sectional view of a humidifier drainage structure according to an embodiment.

Hereinafter, a drainage structure of the water heater tank 61 will be described with reference to FIGS. 11 and 12. Referring to FIGS. 11 and 12, the humidifier 1 may include the mount 72 to which the drainage port 73 is fitted. A gasket 74 may be interposed between the mount 72 and the drainage port 73 to prevent leakage.

The mount 72 may include a recessed portion 726. The recessed portion 726 may be recessed inward from the housing 11. The recessed portion 726 may have a hole 725 through which a shaft 734 of the drainage port 73 may be inserted. As illustrated in FIG. 11, the recessed portion 726 may have a shape corresponding to the drainage port 73. The recessed portion 726 may extend vertically.

The mount 72 may include the intake port 721. The intake port 721 may be positioned adjacent to an upper end of the recessed portion 726. The intake port 721 may protrude into the housing 11 from the recessed portion 726. The intake port 721 may be connected to the second end 712 of the drainage pipe 71. Water drained to the drainage pipe 71 from the water heater tank 61 may flow to the drainage port 73 through the intake port 721.

The drainage port 73 may include an attaching portion 731 and a discharge portion 732. The attaching portion 731 may refer to a portion attached to the mount 72, through which water from the drainage pipe 71 is admitted. The attaching portion 731 may have a flow path inside. The discharge portion 732 may refer to a portion that extends from the attaching portion 731, through which the water admitted to the flow path in the attaching portion 731 is drained.

The attaching portion 731 may have a substantially circular cross-section, for example, in order to maintain contact with the gasket 74 during rotation. For example, the attaching portion 731 may have a substantially spherical shape. The attaching portion 731 may be positioned adjacent to the upper end of the recessed portion 726.

The discharge portion 732 may extend longitudinally from the attaching portion 731. The discharge portion 732 may have a substantially rectangular transverse cross-section. The discharge portion 732 may have a drainage channel 733 inside. The discharge portion 732 may extend from the attaching portion 731 to a position adjacent to a lower end of the recessed portion 726, and a distal end of the discharge portion 732 may be spaced a predetermined distance from the lower end of the recessed portion 726.

A width w1 of the drainage channel 733 at a position adjacent to the attaching portion 731 may be smaller than a width w2 of the drainage channel 733 at a position adjacent to the distal end of the discharge portion 732. The drainage channel 733 may become gradually wider toward the distal end of the discharge portion 732 away from the position adjacent to the attaching portion 731. Thus, when the drainage port 73 is disposed horizontally (see FIG. 12), water may be easily drained to the outside by a slope of an inner lateral surface of the drainage channel 733.

A groove 723 may be formed along a periphery 722 of the intake port 721. The groove 723 may be ring-shaped, for example. The gasket 74 may be inserted into the groove 723. The gasket 74 may be ring-shaped, for example. The gasket 74 may make contact with the attaching portion 731 of the drainage port 73. The gasket 74 may prevent drained water from leaking between the recessed portion 726 and the drainage port 73. The gasket 74 may be compressed between the groove 723 and the attaching portion 731 of the drainage port 73.

A rib 727 that extends along the groove 723 may be provided on the recessed portion 726. The rib 727 may protrude toward the attaching portion 731 of the drainage port 73 from the recessed portion 726. The rib 727 may make contact with the drainage port 73. The groove 723 may be positioned between the rib 727 and the periphery 722 of the intake port 721. The rib 727 may be formed of an elastic material, for example. For example, the rib 727 may be formed of rubber and provided on the recessed portion 726.

The drainage port 73 may be attached to the mount 72 through the shaft 734. The drainage port 73 may be rotated with respect to the shaft 734. When the drainage port 73 rotates, the attaching portion 731 of the drainage port 73 may maintain contact with the gasket 74. The drainage port 73 may be rotated by the user.

FIG. 6 illustrates a case in which water is not drained through the drainage port 73. Referring to FIGS. 6, 11, and 12, as the attaching portion 731 of the drainage port 73 closes over the intake port 721, water drained from the drainage pipe 71 is not drained through the drainage port 73. FIG. 10 illustrates a case in which water is drained through the drainage port 73. Referring to FIGS. 10 and 11, water drained through the drainage pipe 71 may be drained out of the humidifier 1 along the intake port 721 and the drainage port 73.

The drainage port 73 may be switched between the state illustrated in FIG. 6 and the state illustrated in FIG. 10. For example, the user may switch the drainage port 73 between the states illustrated in FIG. 6 and FIG. 10 by manual manipulation.

Embodiments disclosed herein are directed to minimizing odors caused by residual water in a humidifier.

Further, embodiments disclosed herein make it more convenient for a user to manage a water tank.

Furthermore, embodiments disclosed herein provide a structure that may effectively heat the water tank and drain residual water.

Embodiments disclosed herein also make hygiene control of the water tank easier while increasing a capacity of the water tank.

Additionally, embodiments disclosed herein minimize deposits that may be generated from heating the water contained in the water tank.

Embodiments disclosed herein are not limited to the foregoing advantages, and other advantages not mentioned herein will be able to be clearly understood by those skilled in the art from the following description.

Embodiments disclosed herein provide a humidifier that may include a housing; a water heater tank disposed within the housing, with a heater placed at a bottom thereof; a humidification water tank disposed within the housing, and connected to the water heater tank to be supplied with water from the water heater tank; a vaporization unit that vaporizes water contained in the humidification water tank; and a drainage pipe connected to the water heater tank, that drains the water contained in the water heater tank. The drainage pipe may be connected to the water heater tank to release residual water in the water heater tank, and the heater may be disposed at the bottom of the water heater tank to thereby effectively heat the water heater tank.

According to embodiments disclosed herein, the humidifier may further include a mount disposed on the housing, and recessed inward from the housing to provide a receiving space, and a drainage port connected to the drainage pipe, and attached to the mount and positioned in the receiving space. Thus, the drainage port may be attached without protruding.

The drainage port may include an attaching portion connected to the drainage pipe, through which water is admitted, and rotatably attached to the mount, and a discharge portion that extends from the attaching portion, that has a drainage channel inside through which water is drained. Thus, the drainage port may function as a valve as it is rotated.

The mount may include an intake port connected to the drainage port, through which water is admitted from the drainage pipe, and a groove that extends along a periphery of the intake port, to which a gasket is inserted. The attaching portion may have a circular transverse cross-section with respect to an axis of rotation, and may make contact with the gasket inserted to the groove. Thus, leakage may be prevented.

The mount may include a rib that extends along the groove and supports the attaching portion. The groove may be positioned between the rib and a periphery of the intake port. Thus, leakage may be prevented.

The drainage channel may become wider toward a distal end of the discharge portion. Thus, water may be easily drained along a slope.

One or a first end of the drainage pipe connected to a side of the water heater tank may be positioned next to the heater. Thus, the drainage pipe may avoid interference with the heater.

One or a first end of the drainage pipe may be positioned adjacent to the bottom of the water heater tank. Thus, an amount of residual water may be minimized.

The heater may include a ring-shaped heating element, and a plate that surrounds the heating element, recessed downward in at a center thereof and fixed to the bottom of the water heater tank. Thus, the water heater tank may be effectively heated.

According to embodiments disclosed herein, the humidifier may further include a connecting pipe that connects the water heater tank and the humidification water tank. A portion of the connecting pipe connected to the water heater tank may be positioned higher than a portion of the drainage pipe connected to the water heater tank.

The humidifier may further include an outlet cover mounted to an upper side of the housing, and having a discharge opening through which air is discharged; a water tank cover disposed on one side of the outlet cover, and having a filling opening through which water is introduced; and a water softening tank disposed within the housing, positioned below the filling opening, positioned higher than the water heater tank, and connected to the water heater tank. Thus, a small quantity of water may be supplied to the water heater tank and heated.

The humidifier may further include a softening chamber disposed within the softening water tank, that contains a softener. Thus, the water admitted to the water heater tank may be softened.

The humidifier may further include an outer shell coupled to the upper side of the housing, with the outlet cover being attached to an upper side thereof. Thus, humidified air may be discharged upward through the outlet cover.

The humidifier may further include a mount disposed on the housing and recessed inward from the housing, and a drainage port attached to the mount and connected to the drainage pipe. Thus, the drainage port may be attached.

The humidifier may further include a pump that pumps the water contained in the humidification water tank into the water heater tank. Thus, residual water in a plurality of water tanks may be drained through a single drainage pipe.

According to at least one of the embodiments disclosed herein, sanitary steam may be generated using heated water.

According to at least one of the embodiments disclosed herein, odors coming from a water tank may be eliminated by heating the water contained in the water tank.

According to at least one of the embodiments disclosed herein, heating and residual water drainage may be effectively performed by connecting a drainage pipe next to a heater placed at the bottom of the water tank.

According to at least one of the embodiments disclosed herein, deposits that may be generated from heating may be minimized by softening water before heating it.

According to at least one of the embodiments disclosed herein, the amount of residual water may be minimized through a pump by pumping water out of a water tank to which a drainage pipe is not connected into a water tank to which a drainage pipe is connected.

Certain embodiments or other embodiments of the disclosure described above are not mutually exclusive or distinct from each other. Any or all elements of the embodiments described herein may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments that will fall within the scope of the principles of this disclosure can be devised by those skilled in the art. More particularly, various variations and modifications are possible in the component parts and/or arrangements of the subject combination arrangement within the scope, the drawings, and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier, comprising:
- a housing;
- a water heater tank disposed within the housing, a heater being located at a bottom of the water heater tank;
- a humidification water tank disposed within the housing, and connected to the water heater tank to be supplied with water from the water heater tank;
- a vaporization unit that vaporizes water contained in the humidification water tank;
- a drainage pipe that is connected to the water heater tank and drains the water contained in the water heater tank;
- a mount disposed on the housing, the mount being recessed inward from the housing to provide a receiving space; and
- a drainage port connected to the drainage pipe, attached to the mount, and positioned in the receiving space.

2. The humidifier of claim 1, wherein the drainage port includes:
- an attaching portion connected to the drainage pipe, through which water is received, and rotatably attached to the mount; and
- a discharge portion that extends from the attaching portion, and having a drainage channel inside through which water is drained.

3. The humidifier of claim 2, wherein the mount includes:
- an intake port connected to the drainage port, through which water is received from the drainage pipe; and
- a groove that extends along a periphery of the intake port, into which a gasket is inserted, and wherein the attaching portion has a circular transverse cross-section with respect to an axis of rotation, and makes contact with the gasket inserted into the groove.

4. The humidifier of claim 3, wherein the mount includes a rib that extends along the groove and supports the attaching portion, and wherein the groove is positioned between the rib and a periphery of the intake port.

5. The humidifier of claim 2, wherein the drainage channel becomes wider as the drainage channel extends toward a distal end of the discharge portion.

6. The humidifier of claim 1, wherein a first end of the drainage pipe connected to a side of the water heater tank is positioned next to the heater.

7. The humidifier of claim 6, wherein the first end of the drainage pipe is positioned adjacent to a bottom of the water heater tank.

8. The humidifier of claim 1, wherein the heater includes:
- a ring-shaped heating element; and
- a plate that surrounds the heating element, that is recessed downward at a center, and that is fixed to a bottom of the water heater tank.

9. The humidifier of claim 1, further comprising a connecting pipe that connects the water heater tank and the humidification water tank, wherein a portion of the connecting pipe connected to the water heater tank is positioned higher than a portion of the drainage pipe connected to the water heater tank.

10. The humidifier of claim 1, further comprising a pump that pumps the water contained in the humidification water tank into the water heater tank.

11. A humidifier, comprising:
- a housing;
- a water heater tank disposed within the housing, a heater being located at a bottom of the water heater tank;
- a humidification water tank disposed within the housing, and connected to the water heater tank to be supplied with water from the water heater tank;
- a vaporization unit that vaporizes water contained in the humidification water tank;
- a drainage pipe that is connected to the water heater tank and drains the water contained in the water heater tank;
- an outlet cover mounted to an upper side of the housing, and having a discharge opening through which air is discharged;
- a water tank cover disposed at one side of the outlet cover, and having a filling opening through which water is injected; and
- a softening water tank disposed within the housing, positioned below the filling opening, positioned higher than the water heater tank, and connected to the water heater tank.

12. The humidifier of claim 11, further comprising a softening chamber that is disposed within the softening water tank and contains a softener.

13. The humidifier of claim 11, further comprising an outer shell coupled to the upper side of the housing, the outlet cover being attached to an upper side thereof.

14. The humidifier of claim 13, further comprising:
- a mount disposed on the housing, the mount being recessed inward from the housing; and
- a drainage port attached to the mount and connected to the drainage pipe.

15. A humidifier, comprising:
- a housing;
- a water heater tank disposed within the housing, a heater being located at a bottom of the water heater tank;

a humidification water tank disposed within the housing, and connected to the water heater tank to be supplied with water from the water heater tank;

a vaporization unit that vaporizes water contained in the humidification water tank, the vaporization unit including a vibrator that atomizes water using ultrasonic vibration;

a drainage pipe that is connected to the water heater tank and drains the water contained in the water heater tank;

a mount disposed on the housing and including a receiving space; and a drainage port connected to the drainage pipe, attached to the mount, and positioned in the receiving space.

16. The humidifier of claim 15, wherein the drainage port includes:

an attaching portion connected to the drainage pipe, through which water is received, and rotatably attached to the mount; and a discharge portion that extends from the attaching portion, and having a drainage channel inside through which water is drained.

17. The humidifier of claim 16, wherein the mount includes:

an intake port connected to the drainage port, through which water is received from the drainage pipe; and a groove that extends along a periphery of the intake port, into which a gasket is inserted, and wherein the attaching portion has a circular transverse cross-section with respect to an axis of rotation, and makes contact with the gasket inserted into the groove.

18. The humidifier of claim 17, wherein the mount includes a rib that extends along the groove and supports the attaching portion, and wherein the groove is positioned between the rib and a periphery of the intake port.

19. The humidifier of claim 16, wherein the drainage channel becomes wider as the drainage channel extends toward a distal end of the discharge portion.

* * * * *